(12) United States Patent
Braband et al.

(10) Patent No.: US 9,767,968 B2
(45) Date of Patent: Sep. 19, 2017

(54) METHOD AND DEVICE FOR PROTECTING PERSONS IN THE VICINITY OF AN HF FIELD-EMITTING DEVICE

(71) Applicant: SIEMENS AKTIENGESELLSCHAFT, Munich (DE)

(72) Inventors: Jens Braband, Braunschweig (DE); Hendrik Ibendorf, Kleinmachnow (DE); Olaf Richter, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 121 days.

(21) Appl. No.: 14/766,815

(22) PCT Filed: Jan. 3, 2014

(86) PCT No.: PCT/EP2014/050044
§ 371 (c)(1),
(2) Date: Aug. 10, 2015

(87) PCT Pub. No.: WO2014/124759
PCT Pub. Date: Aug. 21, 2014

(65) Prior Publication Data
US 2016/0035507 A1    Feb. 4, 2016

(30) Foreign Application Priority Data
Feb. 15, 2013   (DE) .................. 10 2013 202 468

(51) Int. Cl.
*H01H 9/16*   (2006.01)
*F16P 3/14*   (2006.01)
*B61L 3/12*   (2006.01)
*B61L 23/06*  (2006.01)
*B61K 13/00*  (2006.01)
*G08B 21/02*  (2006.01)
(Continued)

(52) U.S. Cl.
CPC ............... *H01H 9/16* (2013.01); *B61K 13/00* (2013.01); *B61L 3/121* (2013.01); *B61L 23/06* (2013.01); *F16P 3/147* (2013.01); *B61L 2027/0044* (2013.01); *G08B 21/02* (2013.01); *G08B 21/24* (2013.01)

(58) Field of Classification Search
CPC . G08B 21/02; G08B 21/24; B61L 2027/0044; A01B 12/006
USPC ........................................................ 307/326
See application file for complete search history.

(56) References Cited

U.S. PATENT DOCUMENTS 1,893,900 A    1/1933   McClintock
5,315,289 A    5/1994   Fuller et al.
(Continued)

FOREIGN PATENT DOCUMENTS

DE    29623142 U1    11/1997
EP    1701471 A1     9/2006
(Continued)

*Primary Examiner* — Robert Deberadinis
(74) *Attorney, Agent, or Firm* — Laurence Greenberg; Werner Stemer; Ralph Locher

(57) ABSTRACT

A method is provided which protects persons in the vicinity of a high frequency (HF) field-emitting device, in particular a European train control system (ETCS) antenna of a rail vehicle. In order to be able to reliably protect persons from radiation that is detrimental to one's health, the device is held in or switched to an OFF state by an uplink for a limited period of time, the ON/OFF state being optically and/or acoustically signaled.

4 Claims, 1 Drawing Sheet

(51) Int. Cl.
  *G08B 21/24* (2006.01)
  *B61L 27/00* (2006.01)

(56) References Cited

U.S. PATENT DOCUMENTS

| | | |
|---|---|---|
| 6,111,503 A | 8/2000 | Javitt et al. |
| 2002/0081978 A1 | 6/2002 | Hou et al. |
| 2006/0160562 A1 | 7/2006 | Davis et al. |
| 2009/0198502 A1 | 8/2009 | Williams |
| 2011/0021160 A1 | 1/2011 | Vullers et al. |
| 2012/0006610 A1 | 1/2012 | Wallace et al. |
| 2012/0326837 A1 | 12/2012 | Ajay et al. |
| 2013/0106600 A1 | 5/2013 | Hall et al. |

FOREIGN PATENT DOCUMENTS

| | | |
|---|---|---|
| JP | 2009122118 A | 6/2009 |
| WO | 2011085441 A1 | 7/2011 |

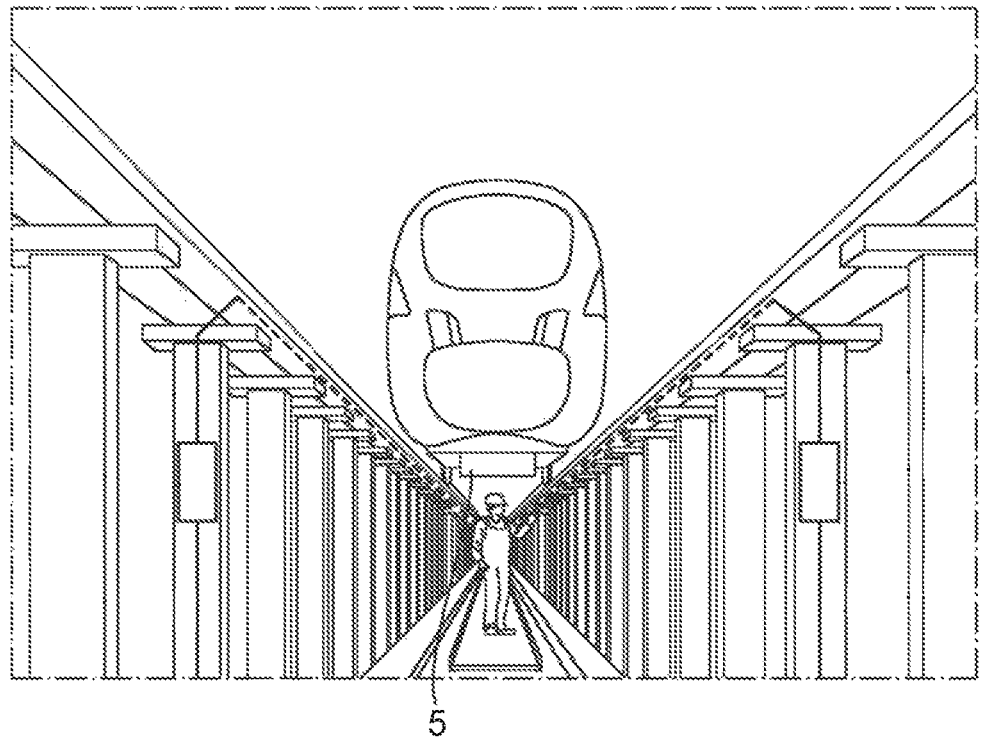
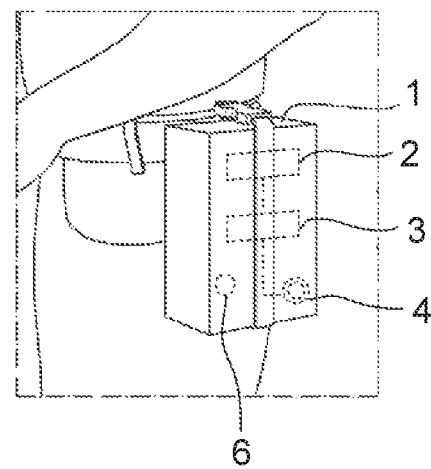

METHOD AND DEVICE FOR PROTECTING PERSONS IN THE VICINITY OF AN HF FIELD-EMITTING DEVICE

BACKGROUND OF THE INVENTION

Field of the Invention

The invention relates to a method for protecting persons in the vicinity of an HF field-emitting device, especially an ETCS (European Train Control System) antenna of a rail vehicle and also to a device related thereto.

Protecting persons when they are in the vicinity an HF field-emitting device is necessary because of the HF radiation that is detrimental to health. Such devices are used in many areas, for example in industrial plants, communication systems and traffic systems. For maintenance, diagnostic or installation purposes in particular, direct contact between persons and these devices is inevitable. The description given below essentially relates to an ETCS antenna of a rail vehicle emitting an HF field, without the invention being intended to be restricted to this application.

ETCS antennas on rail vehicles are used for absolute global positioning and also for data transmission between railroad and rail vehicle. Their transmit power with up to 10 Watts and the frequency range that they use, at around 27 MHz, are detrimental to health for persons in the immediate vicinity of an active, i.e. switched-on, ETCS antenna. With track which is level with the ground it is not possible for persons to be endangered since the ETCS antenna is disposed in the underfloor area of the rail vehicle and thus direct contact between a person and the ETCS antenna is not normally possible. For maintenance work on the other hand the rail vehicle is parked on raised tracks, for example in a depot or in an operator's workshop. In such cases it must be insured that the ETCS antenna is switched off for personal protection or that a sufficiently large safety distance is maintained.

A simple control light on the ETCS antenna, in order to display its on or off state, is not permitted since a possible failure of the control light which cannot be revealed would signal a false safety.

Currently safety when working on the ETCS antenna is only covered by operational regulations and working instructions. Trained personnel, before working inside the vehicle, must make sure that the ETCS antennas are switched off. The danger from HF radiation is not evident for insufficiently trained personnel.

Usually warning notices are attached in the depot area for raised tracks, which warn in general terms about the dangers of high-frequency electromagnetic fields which are emitted by the ETCS antenna. These measures, especially in the absence of specialized knowledge of the maintenance personnel, are only insufficiently safe since the presence of an HF field is not obvious and therefore an absence of hazardous radiation could be suggested.

BRIEF SUMMARY OF THE INVENTION

The underlying object of the invention is to specify a method and a device of a generic type which insure the off state of the device creating an HF field.

In accordance with the method the object is achieved by the device being held in an off state or transferred into said state by means of an uplink (ground to train) for a limited period of time, wherein the on/off state is signaled optically and/or acoustically.

BRIEF DESCRIPTION OF THE DRAWING

The single FIGURE of the drawing is an illustration of a personal safety device according to the invention.

DESCRIPTION OF THE INVENTION

The object is also achieved by a device in which a personal safety apparatus 1—PSA—is provided, which has a control device 2 for switching off the device 5 outputting the HF field-emitting device, a circuit 3 for limiting the period of time for which the device is switched off and a signaling device 4 for optical and/or acoustic signaling of the on/off state.

In this way the presence of an HF field which is detrimental to health is excluded for as long as the off state is signaled by the PSA. It is advantageous above all that the ETCS-antenna, after the end of the limited period of control, assumes the normal operating state again. Renewed control for extending the radiation-free off state, depending on demand, can be undertaken by an operations control center or automatically directly at the PSA, for example by means of track switches of the siding of the operator's workshop, or manually. The output signal of the PSA creates an all-clear tone and/or an all-clear light in relation to the vicinity of the antenna when the ETCS is switched off. The light function can also be used to make a display tablet visible, which indicates that the underfloor area of the rail vehicle is clear, since the ETCS antennas are switched off. For example an operations control center can control and monitor the ETCS antennas for all rail vehicles parked on the usually closely adjacent tracks of the operator's workshop and can visualize the off state on a central display tablet in the hall of the operator's workshop.

Acoustic and/or optical signaling also covers any other signaling option in terms of the invention. It only has to be guaranteed that persons in danger from radiation are given sufficient warning and/or are informed when the radiation source is switched off.

Instead of a stationary personal safety apparatus—PSA—which is preferably suitable for depots or operator's workshops, a mobile deployment of a PSA can also be required. To this end there is provision in accordance with the claims for the PSA to be embodied so that it can be carried by a person, wherein activation means 6 for manual activation of the PSA are provided. The PSA able to be carried also contains a signaling device, which creates the all-clear signal for working in the vicinity of the ETCS antenna when the ETCS antenna is switched off.

To ensure a timely restart after the limited period of time for which the PSA is effective, said apparatus can have a remaining time display. Preferably however the antenna is restarted automatically, provided active ending of the safety requirement, for example by switching off the PSA, is not triggered. Switching off the PSA may if necessary have the simultaneous effect of switching the on state of the ETCS antenna(s) back on.

The invention claimed is:
1. A method for protecting persons in a vicinity of a device emitting a high frequency field, which comprises the step of:

holding or switching the device in an off state for a limited period of time by means of an uplink, wherein the on/off state is signaled at least one of optically or acoustically.

2. The method according to claim 1, wherein the device is a European train control system of a rail vehicle.

3. A system for protecting persons in a vicinity of an apparatus emitting a high frequency field, the system comprising:
    a personal safety apparatus having a control device for switching off the apparatus emitting the high frequency field, a circuit for limiting a period of time for which the apparatus emitting the high frequency field is switched off and a signaling device for outputting an optical and/or acoustic signaling of an on/off state of the apparatus emitting the high frequency field.

4. The device according to claim 3, wherein said personal safety apparatus is carried by a person and has activation means for manual activation of said personal safety apparatus.

* * * * *